(12) United States Patent
Ruijl et al.

(10) Patent No.: US 7,178,253 B2
(45) Date of Patent: Feb. 20, 2007

(54) COORDINATE MEASURING DEVICE WITH A VIBRATION DAMPING SYSTEM

(75) Inventors: Theo Anjes Maria Ruijl, Eindhoven (NL); Jeroen Dekkers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/532,933

(22) PCT Filed: Oct. 17, 2003

(86) PCT No.: PCT/IB03/04596

§ 371 (c)(1),
(2), (4) Date: Apr. 27, 2005

(87) PCT Pub. No.: WO2004/040233

PCT Pub. Date: May 13, 2004

(65) Prior Publication Data

US 2006/0070253 A1    Apr. 6, 2006

(30) Foreign Application Priority Data

Oct. 29, 2002 (EP) .................... 02079527

(51) Int. Cl.
*G01B 5/012* (2006.01)
(52) U.S. Cl. .................... 33/559; 33/503; 33/DIG. 1
(58) Field of Classification Search ............... 33/559, 33/556, 558, 561, 503, DIG. 1
See application file for complete search history.

(56) References Cited

U.S. PATENT DOCUMENTS

| | | | | |
|---|---|---|---|---|
| 4,187,614 A | * | 2/1980 | Abiru et al. ............... 33/559 |
| 4,288,925 A | * | 9/1981 | McMurtry ............... 33/561 |
| 4,601,111 A | * | 7/1986 | Berchtold ............... 33/559 |
| 4,688,326 A | * | 8/1987 | Linke ............... 29/603.05 |
| 4,716,656 A | * | 1/1988 | Maddock et al. ............ 33/503 |
| 4,879,916 A | * | 11/1989 | Juillerat ............... 73/865.8 |
| 5,012,591 A | * | 5/1991 | Asakawa ............... 33/832 |
| 5,111,592 A | * | 5/1992 | Aehnelt et al. ............ 33/561 |
| 5,209,131 A | * | 5/1993 | Baxter ............... 73/865.8 |
| 5,259,122 A | | 11/1993 | Ichiba et al. |
| 5,326,982 A | * | 7/1994 | Wiklund ............... 250/559.19 |
| 5,345,689 A | * | 9/1994 | McMurtry et al. ............ 33/559 |
| 5,390,424 A | * | 2/1995 | Butter et al. ............... 33/561 |
| 5,623,766 A | * | 4/1997 | Ruck et al. ............... 33/561 |
| 6,886,265 B2 | * | 5/2005 | Fracheboud et al. ......... 33/559 |
| 6,971,183 B2 | * | 12/2005 | Brenner et al. ............ 33/559 |
| 7,055,258 B2 | * | 6/2006 | Hajdukiewicz et al. ....... 33/559 |
| 7,086,170 B2 | * | 8/2006 | Hajdukiewicz et al. ....... 33/558 |
| 2005/0229420 A1 | * | 10/2005 | Brenner et al. ............ 33/558 |
| 2006/0053648 A1 | * | 3/2006 | Ruijl et al. ............... 33/559 |

FOREIGN PATENT DOCUMENTS

| | | | |
|---|---|---|---|
| DE | 3625636 A | * | 2/1988 |
| DE | 19731005 A1 | | 2/1999 |
| JP | 01044801 A | | 2/1989 |

* cited by examiner

*Primary Examiner*—Diego Gutierrez
*Assistant Examiner*—Amy R. Cohen

(57) ABSTRACT

A coordinate measuring device having a probe comprising a stylus (14) with a sensing member (18) for contacting the object (15) to be measured, a support unit (13) to which the stylus (14) is connected through elastic means (19), and magnet means (46) for damping vibrations of the stylus (14) by generating eddy currents in conductive material. The elastic means (19) comprise at least one leaf spring (41) made of conductive material, and said magnet means (46) generate eddy currents in said leaf spring (41).

11 Claims, 3 Drawing Sheets

COORDINATE MEASURING DEVICE WITH A VIBRATION DAMPING SYSTEM

The invention relates to a coordinate measuring device having a probe comprising a stylus with a sensing member for contacting the object to be measured, a support unit to which the stylus is connected through elastic means, and magnet means for damping vibrations of the stylus by generating eddy currents in conductive material.

Such a device is disclosed in DE-A-19731005, in which device the elastic means consist of two spring elements, each allowing a movement of the sensing member in one direction. Each spring element is provided with a piece of conductive material positioned in a magnetic field, so that movement of the conductive material generates eddy currents in it, resulting in a damping action on that movement.

Mechanical touch probes are often used in coordinate measuring devices. Such a probe may be provided with a stylus comprising a high-precision sphere at its end, usually made of sapphire. Contact can be made between the stylus and the object to be measured through the sensing member. The location (i.e. three coordinates) of a certain spot on the surface of the object can be measured by detecting the position of the sensing member relative to the support unit, when it is in contact with that spot, provided the position of the support unit with respect to the object is known.

Detection of the position of the sensing member means that the location (three coordinates) of the sensing member is measured, and furthermore that the orientation (three angles) of the sensing member is measured. So, the position of the sensing member is defined by six degrees of freedom. To measure said position, the stylus may be provided with a detection member which is detected by detection means attached to the support unit.

The collision of the sensing member with the object may cause vibrations of the stylus with respect to the support unit, since the stylus is connected to the support unit by said elastic means. Such vibrations may introduce measuring errors, and to decrease these errors a certain settling time is required during which the vibration is damped to an acceptable level.

An object of the invention is to provide a coordinate measuring device by which vibrations of the stylus are damped in an effective and efficient way.

In order to accomplish that objective, the said elastic means comprise at least one leaf spring made of conductive material, such that said magnet means generate eddy currents in said leaf spring.

Vibration of the stylus with the sensing member will also cause said leaf spring to vibrate. When a magnet is located near said leaf spring, eddy currents will be generated in the conductive material of the leaf spring. Due to the electrical conductance of the material, the eddy currents have a damping effect on the movement of the leaf spring and thereby on the vibration of the stylus. Since the eddy current is generated in a leaf spring of the said elastic means, there is no need for an additional element containing the conductive material.

The expression 'leaf spring' has a broad interpretation. The leaf spring may even have the shape of a bar, provided bending of the bar results in an elastic force.

Preferably, said conductive material has a high conductance and is nonmagnetic, so that the magnetic field does not exert forces on the conductive material. The material may be nonmagnetic steel, i.e. steel containing about 12% Mn. However, preferably the conductive material is aluminum or an aluminum alloy, or copper or a copper alloy.

In one preferred embodiment, a leaf spring comprises two portions positioned inclined to each other, an outer portion being connected to the support unit and an inner portion being connected to the stylus. The two portions may be positioned substantially in the same plane. Preferably, the area of the transverse section of said outer portion is smaller than the area of the transverse section of said inner portion. If both portions of the leaf spring have the same thickness, the width of said outer portion is smaller than the width of said inner portion of the leaf spring.

In one preferred embodiment, the elastic means comprise a number of leaf springs made out of one sheet of material, for example a sheet of aluminum. The sheet may have a thickness of between 0.05 and 0.5 mm, good results are obtained by using a thickness of 0.18 mm. The spring member, i.e. the leaf springs, including connecting parts, may be machined out of the sheet material, but any other method of removing material out of the sheet may be used instead.

Preferably, the configuration of the leaf springs of the spring member is rotationally symmetrical, having an axis of symmetry perpendicular to the plane of the spring member. A number of leaf springs are thus positioned around a central part of the spring member, to which central part the stylus with the sensing member is attached. So, the inner ends of the leaf springs are attached to the stylus and the outer ends are are attached to the support unit.

In one preferred embodiment, the elastic means comprise two spaced-apart spring members, each spring member comprising leaf springs, while the magnet means are located between the two spring members. Preferably, each spring member comprises a number of leaf springs made out of one sheet of material, such that the spring members are located parallel to each other. The magnet means thus produce a magnetic field at both sides of the magnetic means, so that each spring member is positioned in one of the magnetic fields.

The configuration of two spring members positioned parallel to each other, each comprising leaf springs, is known from U.S. Pat. No. 5,259,122. Damping means are also present therein, comprising a viscous liquid located between the two spring members.

In one preferred embodiment, the magnet means comprise a number of permanent magnets. Material for such permanent magnets may be cobalt steel or various ferritic alloys. Preferably, the permanent magnets are incorporated in a plate of nonmagnetic material, for example plastic, in which case the magnetic field may extend at both sides of said plate.

Preferably, the permanent magnets are positioned in an array, adjacent to each other. Two or more of such arrays of magnets may be positioned parallel and adjacent to each other, so that in fact a plane of permanent magnets is created. The array or plane of permanent magnets is positioned parallel to each leaf spring in which eddy currents have to be generated. The distance between the leaf spring and the magnet should be small, but there must be enough space for the leaf spring to move.

In one preferred embodiment, the magnetic axes of said permanent magnets are positioned in the plane of said plate and perpendicular to the array, and the width of the array of magnets may be equal to the width of the relevant leaf spring in this arrangement.

The invention furthermore relates to a method of measuring the position of an object, whereby the object is contacted by a stylus of a probe, the probe comprising the stylus with a sensing member, a support unit to which the stylus is connected through elastic means, and magnet means for damping vibrations of the stylus by generating eddy currents in conductive material, wherein the elastic means comprise at least one leaf spring made of conductive material, and wherein said magnet means generate eddy currents in said leaf spring.

The invention will be explained in more detail below by means of a description of an embodiment of a coordinate measuring device, in which reference is made to a drawing, in which.

The Figures are merely schematic representations of an embodiment, in which less relevant parts are not shown.

Figure 1:
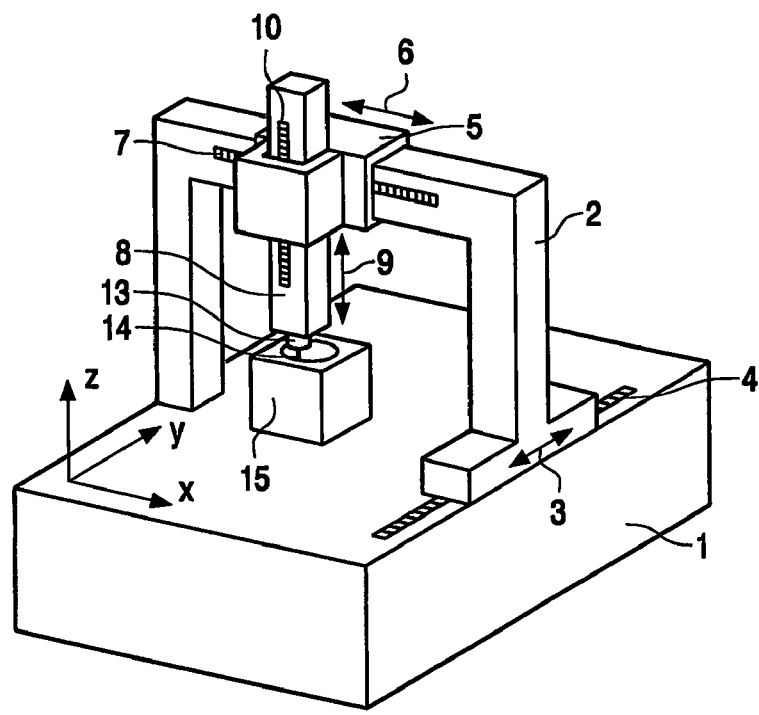
FIG. 1 is a perspective view of a coordinate measuring device.

FIG. 1 shows a coordinate measuring device having a base 1, for example made of granite. On the base 1 there is a first stage 2 which can move in one direction (y-direction) with respect to the base 1, as indicated by arrow 3. The measuring scale 4 shows the linear position of the first stage 2 relative to the base 1.

A second stage 5 can move in one direction (x-direction) with respect to the first stage 2, as indicated by arrow 6. The measuring scale 7 shows the linear position of the second stage 5 relative to the first stage 2. A third stage 8 can move in one direction (z-direction) with respect to the second stage 5, as indicated by arrow 9. The measuring scale 10 shows the linear position of the third stage 8 relative to the second stage 5.

The lower end of the third stage 8 carries a probe, comprising a support unit 13 which is attached to the third stage 8, and a stylus 14 extending downward from the support unit 13. The lower end of the stylus 14 carries a sensing member (not shown in FIG. 1) for contacting the object 15 to be measured. The stylus 14 is connected to the support unit 13 by elastic means, for example spring means, so that the stylus 14 can move with respect to the support unit 13.

By moving the first, the second, and the third stage 2,5,8 with respect to each other and with respect to the base 1, the probe 13,14 can be positioned in any given location relative to the base 1. Such a location can be identified by three values measured on the three measuring scales 4,7,10.

The object 15 to be measured is placed on the base 1 of the coordinate measuring device, which is diagrammatically shown in FIG. 1. The geometry of the object 15 can be determined by measuring the exact location of certain spots on the outer surface of the object 15.

In order to perform such a measurement, the probe 13,14 is moved by moving the stages 2,5,8 in such way that the lower tip of the stylus 14 (the sensing member) abuts against the relevant spot on the surface of the object 15. Then the location of the sensing member relative to the support unit 13 is determined, so that the location of the relevant spot on the surface of the object 15 can be calculated. Repeating such a measurement for different spots on the surface of the object 15 allows the geometry of the object 15 to be determined.

Figure 2:
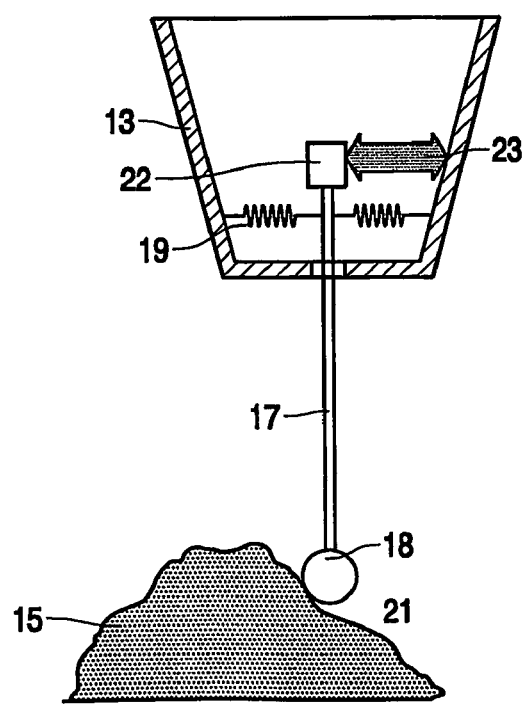
FIG. 2 shows a probe.

FIG. 2 shows the support unit 13 supporting the stylus comprising a stem 17 and a sensing member 18 attached at the lower end of the stem 17. The sensing member 18 is a sphere, preferably a sapphire sphere.

The stylus 17,18 is suspended in the support unit 13 by elastic means 19, so that the stem 17 can move with respect to the supporting unit 13. The stem 17 will deviate from its vertical position if the sensing member 18 is abutting the surface of an object 15.

Since the stem 17 hinges (or moves) relative to the supporting unit 13, a detection member 22 attached at the upper end of the stem 17 will move in accordance with the movement of the sensing member 18. The support unit 13 comprises detection means 23 for measuring the position of detection member 22 relative to the support unit 13. By measuring the position of detection member 22, the location of sensing member 18 can be calculated.

Figure 3:
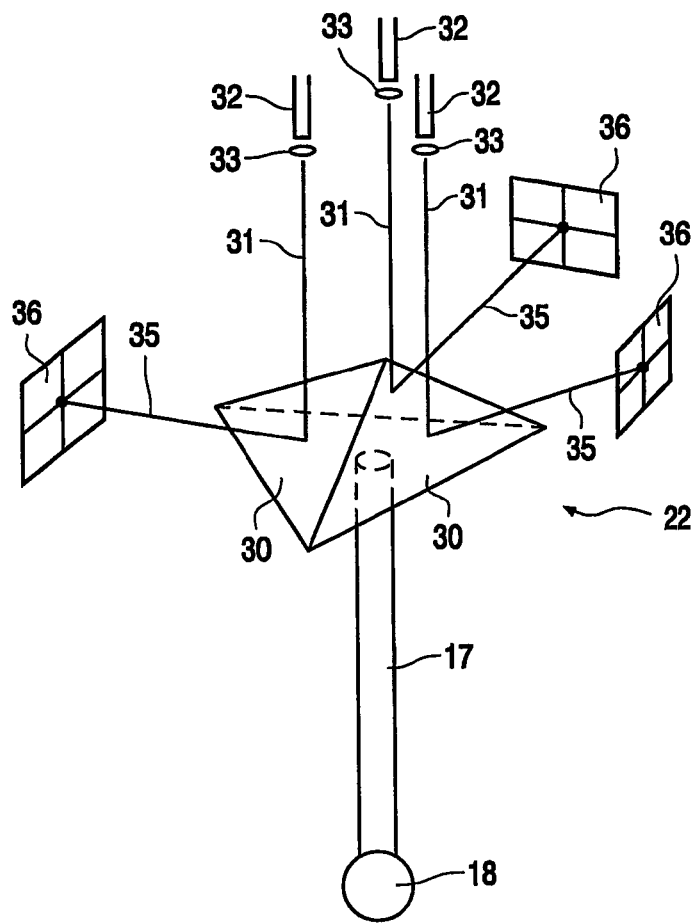
FIG. 3 shows detection means.

FIG. 3 shows an embodiment of the detection means 23 of the probe. The stem 17 carries the sensing member 18 at its lower end and the detection member 22 at its upper end. As explained above, the location of the sensing member 18 can be calculated in that the position of the detection member 22 is measured. The position of the detection member involves the location of the detection member 22 as well as its orientation.

The detection member 22 is shaped as a pyramid having three inclined triangular mirroring surfaces 30. From ahead three laser beams 31 are provided through three fibers 32 and three lens systems 33. Each of the three laser beams 31 is directed to one of the three triangular mirrors 30 of the detection member 22. The three laser beams 35 are reflected by the mirrors 30 and received by three detector screens 36. Each of the three detector screens 36 measures the location where the laser beam hits the screen.

All the components of the detections means 23: the fibers 32, the lens systems 33, and the detector screens 36, are fixed in the support unit 13. Therefore the position of the detection member 22 can be calculated from the data coming from the three detector screens 36, i.e. the locations where the laser beams 35 strike the respective detector screens 36. After the position of the detection member 22 has been measured, the location of the sensing member 18 can be calculated, so that the relevant spot on the surface of the object 15 te be measured is determined.

Figure 4:
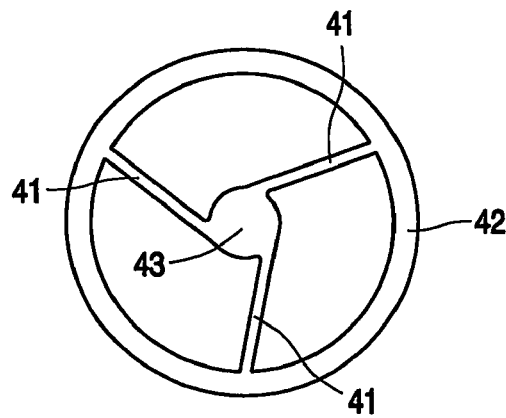
FIG. 4 shows a first embodiment of a spring member.

FIG. 4 shows a first embodiment of a spring member. The spring member is an assembly of three leaf springs 41 which can form the connection between the stem 17 and the support unit 13. The spring member is made out of a flat sheet (plate) of material, having a thickness of, for example, 0.18 mm. Material of the sheet is removed, so that a ring 42, three leaf springs 41, and a central part 43 remain. The ring 42 can be attached to the support unit 13 and the central part 43 can be attached to the stem 17, such that the flexibility of the three leaf springs 41 will provide an elastic connection between the support unit 13 and the stylus 17,18.

Figure 5:
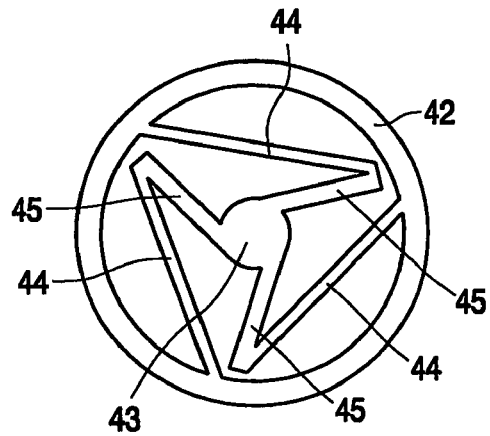
FIG. 5 shows a second embodiment of a spring member.

FIG. 5 shows a more flexible spring member. Here the ring 42 is connected to the central part 43 by three leaf springs, each comprising two portions, an outer portion 44 and an inner portion 45. This spring member is also made out of a sheet of material, for example a flat plate of aluminum.

Figure 6:
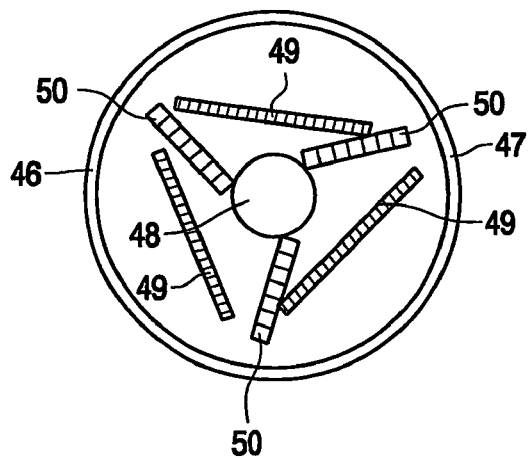
FIG. 6 shows a plate comprising permanent magnets.

FIG. 6 shows a flat plate 46 of nonmagnetic material, for example plastic. The plate 46 has a circular shape with the same diameter as the spring member shown in FIG. 5. Near its circumference (edge) the plate 46 has a ring shaped area 47 having a greater thickness then the rest of the plate. There is a hole 48 in the central part of the plate 46.

In the material of the plate 46 there are embedded six arrays 49,50, each consisting of a number of permanent magnets, such that the locations and the dimensions of the arrays 49,50 correspond to the locations and the dimensions of the leaf springs 44,45 of FIG. 5. The three arrays 49 have the same width as the outer portions 44 of the leaf springs, and the three arrays 50 have the same width as the inner portions 45 of said leaf springs. The permanent magnets are embedded such that they appear at the surface of the plate 46 at both sides of that plate.

Figure 7:
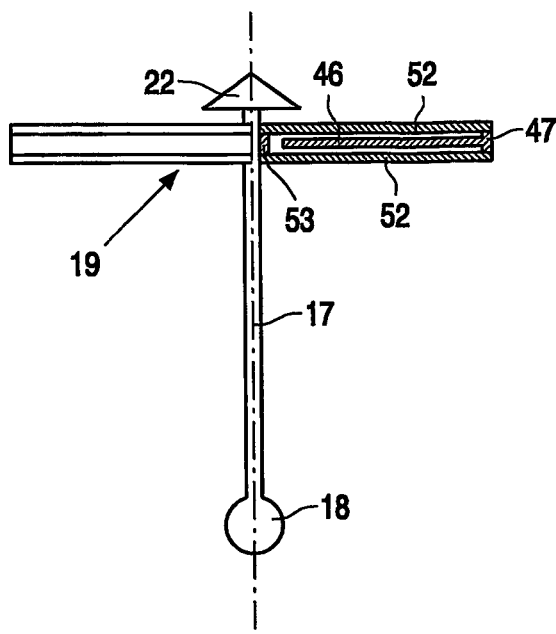
FIG. 7 shows an assembly of spring members and a plate comprising magnets.

FIG. 7 shows a stem 17 having a sensing member 18 at its lower end. Its upper end is carrying a detection member 22, for example formed as a pyramid as shown in FIG. 3. Near the detection member 22, the stem 17 is attached to the central part of the elastic means 19. The elastic means 19 comprise two spring members 52 (as shown in FIG. 5) positioned parallel to each other, and partly shown in a sectional view. Between the two spring members 52 there is a plate 46 (as shown in FIG. 6). Because of the ring-shaped thick portion 47 of the plate 46, there is a certain predetermined distance between each of the two spring members 52 and the plate 46. In the central part of the elastic means 19, a sleeve 53 is present around the stem 17 to keep the two spring members 52 spaced apart. The two spring members 52 and the sleeve 53 are connected to the stem 17, for example, in that they were glued together. The circumferential edge of the elastic means 19 is attached to the support unit 13, which is not shown in FIG. 7.

The six leaf springs 44,45 of the two spring members 52 (shown in FIG. 5) extend at both sides of plate 46 (shown in FIG. 6) in the elastic means 19, so that the portions 44 of the leaf springs are positioned near the array 49 of permanent magnets and the portions 45 of the leaf springs are positioned near the array 50 of permanent magnets. When the leaf springs 44,45 move with respect to plate 46, the magnetic field of the arrays 49,50 of permanent magnets will generate eddy currents in the leaf springs 44,45 at both sides of plate 46, and the movement of the leaf springs will be damped because of the electrical conductance of the material of the leaf springs.

The embodiment of the coordinate measuring device as described above is merely an example; a great many other embodiments are possible.

The invention claimed is:

1. A coordinate measuring device having a probe comprising:
   a stylus (14) with a sensing member (18) for contacting an object (15) to be measured;
   elastic means (19) including two spaced-apart spring members (52), each spring member having a central portion, a circumferential ring portion, and at least one leaf spring (41) extending between the central portion and the circumferential ring portion, wherein each spring member further comprises conductive material;
   a support unit (13) to which the stylus (14) is connected through said elastic means (19), wherein a flexibility of the at least one leaf spring of each spring member provides an elastic connection between the support unit and the stylus; and
   magnet means (46) incorporated within a plate of nonmagnetic material and appearing on surfaces at both sides of the plate of nonmagnetic material, wherein the plate of nonmagnetic material has a circular shape of a same diameter as each of the spring members and has a hole in a central part thereof for passage of the stylus (14) there-through, said plate further having a circumferential ring shaped thick portion that comprises a thickness greater than a thickness of a remainder portion of the plate, wherein the circumferential ring shaped thick portion provides a predetermined distance between each of the two spring members and the plate, wherein the plate is located between the two spaced-apart spring members (52), and wherein said magnet means (46) are further for damping vibrations of the stylus (14) by generating eddy currents in the conductive material of each leaf spring of said elastic means.

2. A coordinate measuring device as claimed in claim 1, wherein said conductive material is a nonmagnetic material.

3. A coordinate measuring device as claimed in claim 1, wherein the conductive material is aluminum or an aluminum alloy, or copper or a copper alloy.

4. A coordinate measuring device as claimed in claim 1, wherein each leaf spring (41) comprises two portions positioned inclined to each other, an outer portion (44) being connected to the support unit (13) and an inner portion (45) being connected to the stylus (14).

5. A coordinate measuring device as claimed in claim 1, wherein each spring member of the elastic means (19) further comprise a number of leaf springs (41) and are made out of one sheet of material.

6. A coordinate measuring device as claimed in claim 1, wherein the configuration of the leaf springs (41) is rotationally symmetrical, having an axis of symmetry perpendicular to the plane of the leaf springs (41).

7. A coordinate measuring device as claimed in claim 1, wherein each spring member (52) comprises a number of leaf springs (41) made out of one sheet of material, further wherein the spring members (52) are located parallel to each other.

8. A coordinate measuring device as claimed in claim 1, wherein the magnet means (46) further comprise a number of permanent magnets.

9. A coordinate measuring device as claimed in claim 8, wherein the permanent magnets are positioned in an array (49,50), adjacent to each other.

10. A coordinate measuring device as claimed in claim 9, wherein the magnetic axes of said permanent magnets are positioned in the plane of said plate (46) and perpendicular to the array (49,50).

11. A method of measuring the position of an object (15), whereby the object is contacted by a stylus (14) of a probe, the probe comprising the stylus (14) with a sensing member (18), a support unit (13) to which the stylus (14) is connected through elastic means (19), and magnet means (46) for damping vibrations of the stylus (14) by generating eddy currents in conductive material, wherein the elastic means (19) comprise two spaced-apart spring members (52), each spring member having a central portion, a circumferential ring portion, and at least one leaf spring (41) extending between the central portion and the circumferential ring portion, wherein each spring member further comprises conductive material, wherein a flexibility of the at least one leaf spring of each spring member provides an elastic connection between the support unit and the stylus, and wherein said magnet means are incorporated within a plate of nonmagnetic material and appearing on surfaces at both sides of the plate of nonmagnetic material, wherein the plate of nonmagnetic material has a circular shape of a same diameter as each of the spring members and has a hole in a central part thereof for passage of the stylus (14) there-through, said plate further having a circumferential ring shaped thick portion that comprises a Thickness greater than a thickness of a remainder portion of the plate, wherein the circumferential ring shaped thick portion provides a predetermined distance between each of the two spring members and the plate, wherein the plate is located between the two spaced-apart spring members (52), and wherein said magnet means (46) further generate eddy currents in the conductive material of said leaf spring (41).

* * * * *